United States Patent [19]

Wenske et al.

[11] Patent Number: 4,709,182

[45] Date of Patent: Nov. 24, 1987

[54] METHOD AND APPARATUS FOR TIGHTENING OR LOOSENING SCREW-TYPE CONNECTIONS

[75] Inventors: Hanno Wenske; Arnold Gallien; Martin Kauschinger; Klaus Unger; Josef Brendel, all of Grimma; Lutz Lampe, Hermsdorf, all of German Democratic Rep.

[73] Assignee: VEB Chemieanlagenbaukombinat Leipzig/Grimma, Grimma, German Democratic Rep.

[21] Appl. No.: 874,245

[22] Filed: Jun. 13, 1986

[30] Foreign Application Priority Data

Jun. 20, 1985 [DD] German Democratic Rep. ... 277574

[51] Int. Cl.$^4$ ............................................. H01L 41/08
[52] U.S. Cl. .................................... 310/316; 310/311; 310/323; 310/317; 310/319; 73/DIG. 4; 73/862.23; 73/862.41; 73/862.59; 173/5; 81/469; 81/479
[58] Field of Search ............... 310/311, 316, 317, 319, 310/321, 323, 325, 51; 73/862.21, 862.33, 862.23, 862.35, 862.24, 862.36, 862.32, 862.41, 862.59, 862.61; 81/463, 467, 469, 479, DIG. 12; 51/59 SS, DIG. 11; 173/1, 2, 5, 7, 12, 90, 171, 162 R; 175/56, 57; 366/127, 600

[56] References Cited

U.S. PATENT DOCUMENTS

| | | | |
|---|---|---|---|
| 3,511,323 | 5/1970 | Riley, Jr. ......................... | 310/323 X |
| 3,561,462 | 2/1971 | Jugler ............................. | 310/323 X |
| 3,614,484 | 10/1971 | Shoh ................................ | 310/325 |
| 3,619,671 | 11/1971 | Shoh ................................ | 310/325 |
| 3,809,977 | 5/1974 | Balamuth et al. ............. | 310/325 X |
| 3,813,616 | 5/1974 | Antonevich .................... | 310/325 X |
| 4,065,687 | 12/1977 | Mishiro .......................... | 310/325 X |
| 4,168,447 | 9/1979 | Bussiere et al. ................ | 310/323 X |
| 4,277,758 | 7/1981 | Mishiro .......................... | 310/316 X |

OTHER PUBLICATIONS

Ultrasonics, article from *News in Engineering*, Jan. 1966.

*Primary Examiner*—Mark O. Budd
*Attorney, Agent, or Firm*—Jordan and Hamburg

[57] ABSTRACT

A method and apparatus for tightening or loosening screw-type connections, in which the screw bolt is stimulated to oscillate longitudinally, the natural frequency of the bolt is measured and the excitation frequency is made to follow the changing natural frequency during the bolting process with a minimum, necessary excitation energy, so that the screw bolt attains a permanent state of resonance.

10 Claims, 5 Drawing Figures

METHOD AND APPARATUS FOR TIGHTENING OR LOOSENING SCREW-TYPE CONNECTIONS

The invention relates to a method and an apparatus of the above-mentioned type, which can be used in heavy machinery and apparatus construction as well as in the precision mechanics field. It is an object of the invention to carry out a bolting process with a high degree of accuracy up to a specified tension, said bolting process being easily controllable and ensuring a high degree of uniformity when a large number of bolted connections are manipulated. It is a further an object of the invention to develop an apparatus for the method described above, which can be handled easily and used multivalently. The apparatus shall be of compact construction and usable also at not readily accessible sites, while the method shall save energy and work so as to avoid any overloading of material.

This objective is accomplished inventively owing to the fact that the screw bolt is stimulated to oscillate longitudinally, the natural frequency of the bolt is measured and the excitation frequency is made to follow the changing natural frequency during the bolting process with a minimum, necessary excitation energy, so that the screw bolt comes to be in a permanent state of resonance. Moreover, an apparatus for carrying out the method is described.

The invention relates to a method and an apparatus for tightening or loosening screw-type connections and can be used to construct machinery, apparatus, etc., in which bolted connections frequently must transfer large forces, as well as, for example, also in the precision mechanics field, where it is frequently important that a complex of such connections is tightened with great uniformity and precisely up to a determined load.

For tightening or loosening screw-type connections, a large number of implements are known, which differ in the nature of the driving mechanism used, in the way in which power is transmitted and motion is propagated, in their handling characteristics and in other ways. Nevertheless, these implements can be divided into three groups, essentially corresponding to the principle on which their function is based, namely into power wrenches, impact wrenches and those wrenches which decrease the frictional resistance between sliding or threaded surfaces by vibrations. the mode of operation of the power wrench, in strict analogy to the manual bolting process, takes place by the transfer of power by means of a lever to a wrench or the like, the only difference being that human power is replaced by machine power, which is generated by electrical, pneumatic or hydraulic driving mechanisms. For example, the DE-OS No. 2,529,818 and the DD-WP No. 62,789 show constructions using this principle. They differ mainly in the nature of the elements used to transfer power to the bolt that is to be turned. While the former uses a clamp fitting, a combination of latching collars and pawls are used with the latter.

Impact wrenches realize the screwing motion through a rapid sequence of impacts by a unit with a pulsed rotary motion on the nut to be screwed, etc., by means of which the pulse energy of this unit is converted into a jerky motion of the nut. So-called high-frequency impact wrenches, driven by alternating current, operate with an impact frequency of up to about 500 Hz.

All of the previously mentioned driving mechanisms are also used with impact wrenches. However, a primary electrical driving mechanism, which produces the pulsed rotary motion only over an interposed hydraulic or pneumatic mechanism, is frequently used. Such a design is disclosed in the German Offenlegungsschrift No. 3,231,902.

The operation of impact wrenches is associated with the generation of unpleasant vibrations and noises, so that the operation of such devices over longer periods of time represents a great physical burden. Compared to power wrenches, these devices have a larger mass relative to the maximum torque and therefore are manufactured only as manually operated devices for relative small torques.

Furthermore, a clear torque limitation is not possible, since the nature of the surfaces and of the materials rubbing against one another, as well as the coefficient of friction, decreased by possible vibrations, exert an increasing influence especially in the final load stage on the moment required for a rotary motion. The large mechanical stress exerted by the devices due to the pulsed motion sets high requirements for the wear resistance of many individual parts.

For many applications, an accurate tightening force, equal for all bolted connections, is desirable. Especially in automatic installations, this requires a high correspondence of the point at which the torque of the individual devices is switched off. Such a correspondence cannot be achieved, for example, with a friction slip clutch.

A circuit arrangement for a torque cutoff of a speed-controlled impact wrench driven by an electric motor is described in the German Offenlegungsschrift No. 2,835,382 and provides for tapping a voltage proportional to the load on the motor at load resistances, the current flow during the impact process producing in an integrator a summation process, the final amount of which represents a measure of the impact energy absorbed. A voltage, proportional to this energy, is compared with the desired value in a comparator. When this desired value is exceeded, the supply of current to the motor is interrupted.

Admittedly, this circuit arrangement is suitable for interrupting the bolting process with an excess of torque, not greater than the energy supplied by the last impact. However, the negative influences, resulting from the surface-and material-dependent as well as tension-dependent frictional forces are neither compensated for nor eliminated by this arrangement. Nevertheless, high accuracies are possible only by carrying out frequent calibrations, which detect all functional relationships and all changes including, for example, also those when only the bearing surface of the nut varies.

A process, which corresponds to the third group and employs vibrations in the frequency range of 4 to 60 kHz, is described in the German Offenlegungsschrift 2,354,346. According to this process, a tool is used to tighten the screw, the screw or one of the structural components to be connected is acted upon by vibrational energy, with a previously selected frequency being employed.

Admittedly, the frictional resistance and, with that, the torque required can be reduced considerably by these means, however, with the disadvantage that torque can no longer be used as an indirect measure of the tensile stress exerted on the screw bolt. The above-mentioned Offenlegungsschrift does not contain any statements as to how information concerning the tensile stress, as the actual target quantity of most bolting processes, can be obtained. perhaps the problems in this respect represent the main reason for the insignificant spread of such methods and apparatuses.

It is an object of the invention to provide a method for tightening or loosening screw-type connections, which is applicable with equally high precision for bolted connections and bolting forces of very different orders of magnitude and, more particularly, enables a large number of bolted connections to be tightened simultaneously and uniformly with accurate control. Moreover, a further object is the provision of an apparatus for implementing the method, which can be used in manifold ways, is handled easily and safely and can be produced inexpensively and on a large scale.

The invention provides a method and an apparatus for tightening and loosening screw-type connections, the process ensuring an energy-saving and accurately controllable bolting process, which avoids any excessive stress on the material. The apparatus is the compact and robust construction, and can be adapted easily to different bolted connections and bolting forces.

This object is achieved in accordance with the invention by stimulating the screw bolt or the like to oscillate longitudinally, measuring the natural frequency of the bolt and controlling the excitation frequency to follow the changing natural frequency during the bolting process, so that the screw bolt comes to a permanent state of resonance. The natural frequency of the screw bolt is, moreover, used as a measure of its tension and is measured by a vibration sensor. The vibrator, which is in contact with the head of the bolt, the nut or the screw bolt or a vibration transmitter, is constructed as a piezoelectric element and is connected with an alternating voltage generator, which in turn is connected with a differentiating element. Moreover, the differentiating element is connected with the oscillation sensor and fed back with the alternating voltage generator. Preferably, a compact oscillator-sensor unit is used, which is a vibrator as well as an oscillation sensor in the form of a piezoelectric ring disk.

It is particularly advantageous to operate the bolting process with a piezoelectric motor, which is driven at the same frequency as the excitation frequency or the natural frequency of the screw bolt. To tighten several screw-type connections simultaneously and uniformly, one device can be used as master device, the vibrator of which produces a sliding desired value for the other devices.

A further variant of the uniform tightening of screw-type connections consists of employing the process initially until a first desired value is reached, which corresponds to a selected pretensioning force. When all the connections have reached this desired value, the bolting process is continued over further, graded desired values or directly until the final desired value is reached, which corresponds to the desired bolt tension.

The excitation energy is increased continuously or stepwise during the bolting process, when this process is a tightening process—as soon as the natural frequency of the screw bolt, as a consequence of the lack of movement during the bolting process, no longer changes and does not yet correspond to the desired bolt tension. Moreover, by these means a maximum specified or desired thermocouple for the driving mechanism is barely not exceeded.

The invention is explained in greater detail in an example of the operation and by means of the following Figures.

The apparatus of the invention can be adapted to the needs of the most diverse application possibilities. This refers to the magnitude of the force to be transmitted as well as to the use in high-technology processes, in connection with robot technology. Because of their robustness, compactness and reliability, these apparatuses can also be handled easily at building sites, a motor-operated or manual driving mechanism being used.

Figure 1:
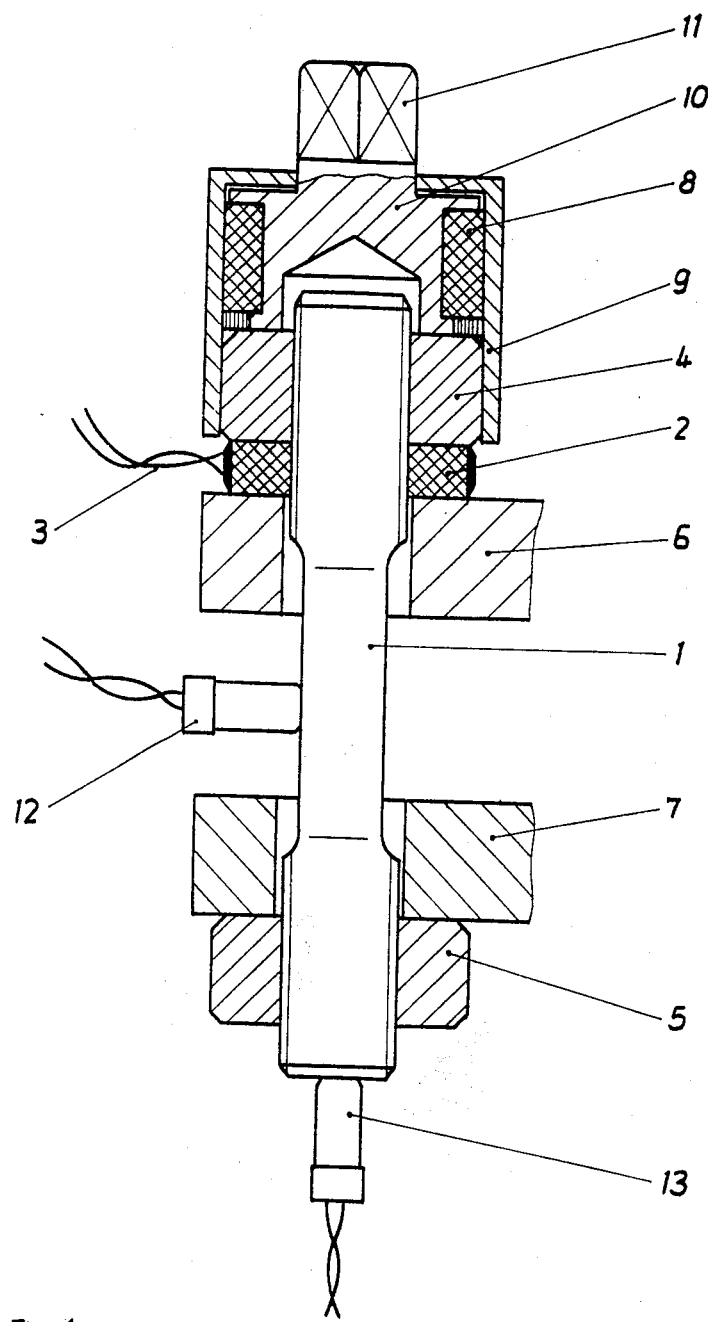
FIG. 1 represents a flange connection with compact vibrator/sensor unit disposed between the nut and the flange and with a mounted piezoelectric driving mechanism.

FIG. 1 shows a flanged joint with an annular disk-shaped piezoelectric element 2 serving as a transverse vibrator and as a compact vibrator/sensor unit, disposed between the nut 4 and the flange 6. This means that the piezoelectric element 2 should operate as the vibrator as well as the oscillation sensor. For this purpose it has energy and signal lines 3, which are connected with a control circuit. If the piezoelectric element 2 is to function only as a vibrator, a separate oscillation sensor 12 or 13 must be provided, which picks up the oscillations to be measured and feeds the measurement signals into the control circuit. Such an arrangement will be referred to as a spatially separate vibrator/-sensor unit. There is no need here to use piezoelectric oscillation sensors 12; 13; for example, strain gauges, glued to the shaft of the screw bolt, can also be used. As furthermore shown in FIG. 1, the rotational movement of the nut 4 and, with that, the tightening or loosening of the screw-type connection is effected by a motor-operated driving mechanism, which is constructed here as a piezomechanic rotary driving mechanism. The motor housing is practically identical with the socket wrench casing 9, the lower region of which is in the form of an internal polyhedral. This region can also be constructed to be exchangeable, so that the driving mechanism can be used for wrenches of different sizes.

Rotary vibrators 8 are supported between the socket wrench casing 9 and the powdered iron core 10. Axially, the powdered iron core 10 carries a coupling 11, which protrudes through the socket wrench casing 9 and serves for manually turning or pretensioning the connections, for mounting the immobilizer or for increasing the rotor inertia by mounting mass bodies, depending on the requirements.

Figure 2:
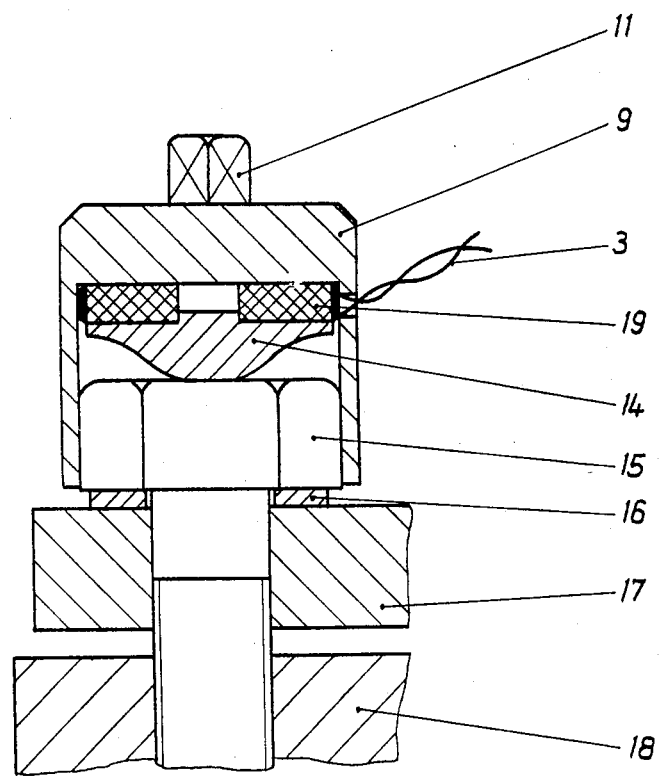
FIG. 2 represents an oscillator attachment with a rotorlike driving mechanism, which can be coupled separately.

FIG. 2 represents a further variation of the arrangement of a compact vibrator/sensor unit. The flanges 17; 18, which lie closely together, and assuming the inaccessibility of the other end of the screw, which is not shown here, prevent a separate oscillation sensor from being used. Consequently, it is necessary to use a compact vibrator/sensor unit, as is required in FIG. 1 between nut 4 and flange 6 or as in FIG. 2 between the base of the socket wrench casing 9 and an oscillation transmitter 14. The latter variation providing to an oscillator attachment, which is mounted on a screw head 15. Here also, the piezoelectric electric element 19 is a transverse vibrator, which functions equally as a vibrator and as an oscillation sensor. The coupling 11 serves the same requirements, which have already been described above and possibly, in addition, for holding a separate driving mechanism. Of course, the structural combination with the oscillator attachment of FIG. 1, which is not shown here, is also possible and also necessary for use in many automated processes.

Some important variations of the arrangement and design of the vibrators, the oscillation sensors and the driving mechanism have been described. These are a part of the apparatus of the invention and, because of their physical contact with the screw-type connection, also form, as it were, a spatial unit, a large number of which may be disposed in a flexible frame for an automatic process and connected over a cable with the remaining devices of the apparatus.

Figure 3:
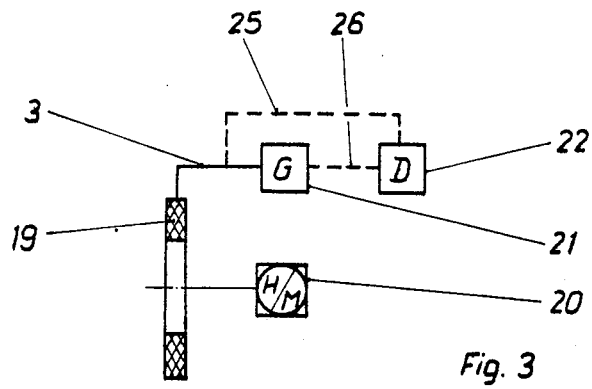
FIG. 3 represents a basic circuit of the inventive apparatus.

The basic circuit of the apparatus using a compact vibrator/sensor unit, which provides the minimum requirements, is reproduced in FIG. 3. According to this, circuit the piezoelectric element 2 is connected via energy and signal lines 3 to an alternating voltage generator 21 of variable frequency and output, which causes the piezoelectric element to oscillate. In order to be able to effect bolting processes on connections of widely varying dimensions with only one type of alternating voltage generator 21, the latter must have a wide frequency range, which should extend from about 50 Hz to $5 \times 10^3$ MHz. Much the same applies to the power, which must be made available and which varies with the mass that can oscillate and with the tension on the screw-type connection and therefore with the natural frequency of this connection.

As far as the measurements are concerned, there is a connection between the alternating voltage generator 21 and the piezoelectric element 2 as oscillation sensor on the one hand and a differentiating element 22 on the other over the signal line 25. With compact vibrator/sensor units, this is possible over only one signal line 25, since the energy and signal line 3 can also function as such in one line and the measurement of natural and excitation frequencies takes place at different times over said energy or signal line 25 analogously to the measurement and excitation phases. When using a separate oscillation sensor 12; 13, a corresponding additional connection to the differentiating element 22 must be established. A further signal line 26 is used to supply feedback from the differentiating element 22 to the alternating voltage generator 21 for the purpose of controlling the excitation frequencies and the excitation power. In this example, the driving mechanism 20 and the control circuit do not affect one another in any way. The driving mechanism may be of either kind, motor-operated or also manual.

Figure 4:
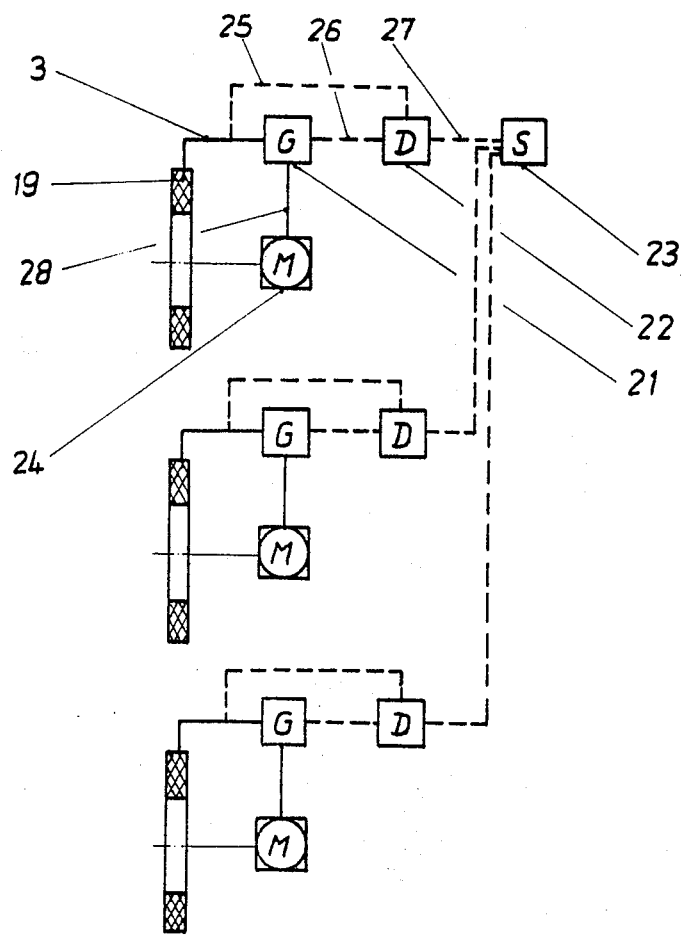
FIG. 4 represents a multiposition apparatus, coupled over a common desired value setter.

FIG. 4 shows a multiposition device, constructed from individual devices of the basic circuit described above, which are coupled together over a common desired-value setter 23. The particularly advantageously usable piezomechanical driving mechanisms 24 are supplied over the energy output 28 from the alternating voltage generator 21 with the same frequency as the piezoelectric elements 2, as a result of which an exceptionally high degree of energy efficiency can be achieved.

Figure 5:
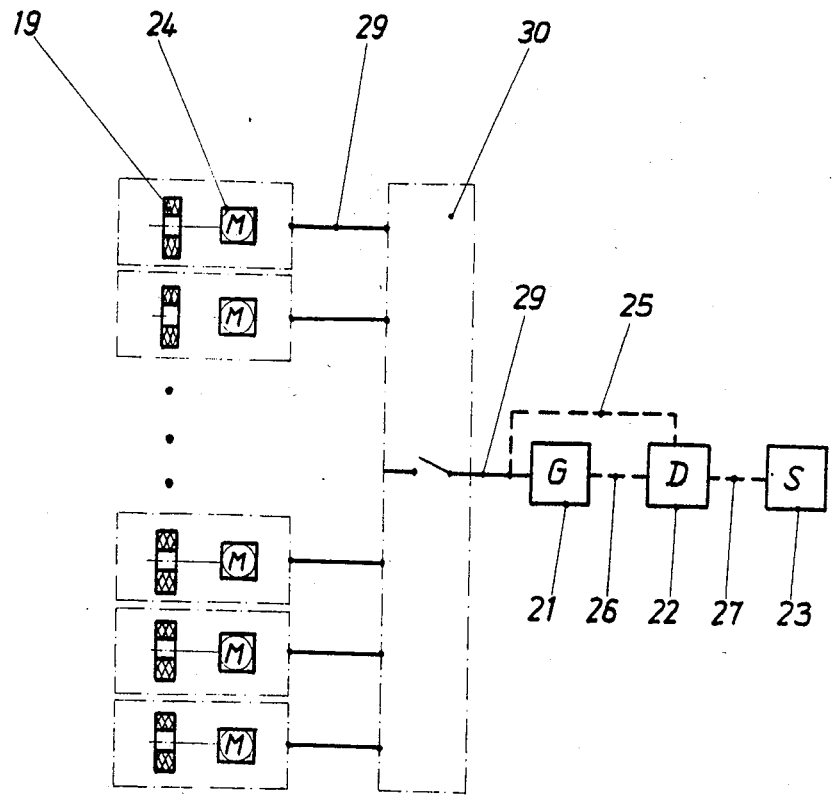
FIG. 5 represents a multipoint device with a common control section and a program selection switch.

When using the multipoint devices, shown in FIG. 5, the cost of the equipment can be reduced owing to the fact that only one control circuit with alternating generator 21 and differentiating element 22 is assigned to a number of units consisting of driving mechanisms 24 and piezoelectric elements 19. The combination of the two complexes guarantees the energy and signal line 29, which is interrupted by the program selector switch 30. The program selector switch 30 establishes the appropriate connections in accordance with a previously established sequence. When using a graded desired value, which is locked onto the differentiating element 22 over signal line 22 by the desired value setter 233, a sufficiently uniform tightening process, which satisfies the requirements of many individual cases, is achieved in spite of the fact that only one of the devices, combined into the multipoint device, is in action at a particular time.

The method of operating the apparatus and the function of the apparatus will be described in the following.

The method of the invention makes use of the ability of rigid elastic bodies to oscillate when stimulated sufficiently and, while so doing, to change their geometric dimensions periodically within certain limits. In order to facilitate the tightening or loosening of screw-type connections, it is thus desirable to largely relieve the tensile or compressive stress acting on the screw bolt 1, the threaded tube, etc. during the bolting process. This is possible in a simple manner owing to the fact that the screw bolt 1 is stimulated to oscillate longitudinally and caused to resonate. For this purpose, vibrators, preferably piezoelectric elements 2; 19, are used, the excitation frequency of which is made to track the natural frequencies, which also change because the tension varies during the bolting process. In order to attain adequate stretching or contraction of the screw bolt 1, the excitation energy is increased until it is possible to turn the nut 4 or the bolt head sufficiently easily. The energy output, which must be mustered to set a screw-type connection into a state of appropriate resonant oscillations, amounts to only a fraction of the power required for conventional methods and apparatuses to manipulate screw-type connections. The invention thus utilizes the circumstance that brief changes in the dimensions of workpieces in the elastic range of their materials can be brought about significantly more advantageously by producing a state of resonance. Depending on the magnitude of the excitation energy transferred, there is a greater or lesser stress reduction on the screw bolt 1 in the period of the resonance frequency.

By these means, quasi steady, relatively easy sliding between the contacting threaded surfaces as well as between the end surface of the nut 4 and the piezoelectric element 2 becomes possible during the bolting process. Moreover, static friction, which has to be overcome, no longer plays a dominant role; it can be eliminated almost completely by a sufficiently strong excitation.

The natural frequency serves as a measure of the tension on the screw bolt 1 and, with a proportional increase, is subject to a progressive rise. For this reason, tension values, which agree very well, are also achievable for bolted precision connections. By calibrating the screw bolt 1, the relationship between the value of the tension and of the natural frequency is determined. The bolting process is limited by a comparison of the natural frequency, changing during bolting process, with a desired value determined from the calibration curve. The interruption of the supply of energy to the vibrator over the energy and signal line 3 or the energy line 28 also ends the state of oscillation of the screw bolt 1; the nut 4 is firmly fixed instantaneously and can be moved only by employing large forces. When using this method, it is also advantageous that there no longer is any twisting even when thin bolts 1 are subjected to the highest tensions.

There are two possibilities for safeguarding the screw bolt 1 against overloading, for example, because of a failure of the desired value setter 23—on the one hand, by comparison of consecutively measured natural frequencies of the screw bolt which, after exceeding the maximum tensile strength, fall off precipitously and, on the other, by comparison of the natural frequency with the excitation frequency of the alternating voltage generator 21 in a differentiating element 22, which leads to a change in sign when the maximum load limit is exceeded. In both cases, the bolting process is terminated immediately and the response of the overload protection is signalled in a meaningful manner. In the latter case, it may, however, be necessary to permit the excitation frequency to be exceeded by an amount or by a percentage when it is possible to overshoot the natural frequency while tracking the natural frequency.

A particularly advantageous variant of the driving mechanism is represented by the piezomechanical motor, which is driven with the same frequency as the excitation frequency or the natural frequency of the screw bolt. This ensures that the driving mechanism 24 consumes energy only when the screw bolt 1 is in the stretching phase and thus can perform work by turning the nut 4.

If the objective is to tighten several screw-type connections simultaneously and uniformly, it is advantageous to work with a sliding desired value, that is, with a controlled desired value that is heading for the target value. In so doing, one threaded joint assumes the function of a control station, the oscillation frequency of which corresponds to the so-called sliding desired value, while only the master device is acted upon by a target desired value. For very high accuracy requirements, the possibility exists of providing, over and above the deceleration of the drift velocity, a feedback from the dependent devices to the master device, so that the sliding desired value is increased only when all the dependent devices have reached the temporarily desired value. It will surely be infrequent that such an effort is resorted to, since the course of the increase in tension proceeds degressively, so that initial differences in tension are soon levelled out by the bolting process, the rate of which decreases with time. Differences due to technical causes, especially those having an effect on the initial bolting velocity, can be rendered inoperative if for no other reason than that the drift between the master device and the dependent devices is fixed overall to a time value $$t_o = (0.05 \ldots 0.2) \frac{n}{f_o}$$

in which
n = the number of oscillations in an interval of a bolting process that is carried out in intervals
$f_o$ = the excitation frequency at the start of an interval
In order to be able to ensure better monitoring, a warning signal should be given if the desired value, namely the target desired value, is not attained.

To summarize, the invention is explained once again by means of the variation, which is shown in FIG. 4 and the individual devices of which include the basic circuit of FIG. 3. In addition, it is assumed that compact vibrator/sensor units (FIGS. 1 and 2) and piezomechanical driving mechanisms (FIG. 1) are used. Furthermore, a simple, graded, desired value, which specifies, first of all, the signal corresponding to a selected, common pretension and, when this is reached, the desired target value through all devices. In addition, all devices are coupled over signal lines 27 with the desired value setter 23.

The lowest excitation frequency of the alternating voltage generator 21 can be preselected so that it lies close below the natural frequency of the screw bolt. The piezoelectric element 2; 19, which is supported on the flange 6 or on the base of the socket wrench casing 9, is excited via the energy and signal line 3. The oscillations are now transmitted over nut 4 or oscillation transmitter 14 to the screw bolt 1, exciting this to oscillate. At the same time, the piezomechanical driving mechanism 24 is supplied via the energy line 28. The differentiating element 22 receives measurement signals of the excitation frequency via the signal line 25 and compares these with measurement signals of the natural frequency of the screw bolt over the same signal line 25. For this purpose, a time function element, which is not shown here, interrupts the operation of the alternating voltage generator 21 for a very short period. The screw bolt 1, excited to the natural oscillations, now transfers its oscillations directly or indirectly to the piezoelectric element 2; 19, as a result of which this gives off a measurement signal. If the natural frequency differs from the excitation frequency, there is feedback over the signal line 26 and the excitation frequency is adjusted to the natural frequency in order to be able to maintain the resonance. This is done until the target quantity stored in the desired value setter 23, in this case the signal of the desired pretension, is reached by the natural frequency. Whether the natural frequency has changed from one measuring interval to another is also checked in the differentiating element. When this is not the case, no bolting process can take place because the excitation energy is not sufficient to relieve the stress on the screw bolt 1 adequately. here also, there is feedback to raise the excitation energy over signal line 26.

It is pointed out here that all aforementioned interruptions of the bolting process for the purpose of measuring or adjusting are of the order of fractions of a second.

When the desired value, corresponding to the pretension selected, is reached by all the devices, the desired value setter 23 switches over automatically to the desired target value. A very uniform bolting process, which stresses all connections equally at any time, can be realized with this simple method.

Advantages of the Invention:
The process
can be used with screw connections with very different dimensions and tensions
saves energy and
and can be controlled or regulated accurately.
The apparatus
can be used multivalently,
is of compact and robust construction and
can be handled easily and safely.
It operates largely in a frequency range, which cannot be heard or sensed by man.
What is claimed is:

1. Method for tightening or loosening screw-type connections using oscillation energy, a screw bolt or a nut being turned preferably by motor, comprising stimulating the screw bolt to oscillate longitudinally, measuring the natural frequency of the screw bolt and controlling the excitation frequency during the bolting process to follow the changing natural frequency, so that the screw bolt resonates, and adapting the excitation energy in such a manner, that the oscillating screw bolt in the phase of maximum stretching or contraction is largely relieved of tensile or compressive stresses respectively.

2. Method as defined in claim 1, comprising the natural frequency as a measure of the tension on the screw bolt and comparing it with a desired value, which corresponds to the intended final tesnion on the screw bolt, the oscillations being discontinued and the bolting process ended when said final tension is reached.

3. Method as defined in claim 1, comprising driving a piezoelectric motor with the same frequency as the excitation frequency or the natural frequency of the screw bolt in order to effect the bolting process.

4. Method as defined in claim 1, wherein, for the purpose of simultaneously and uniformly tightening at least two screw-type connections, comprising using a device for implementing the method as master device, the vibrator of which affects the generation of a sliding desired value for all other devices.

5. Method as defined in claim 1, wherein, for the purpose of simultaneously and uniformly tightening at least two screw-type connections, effecting the method stepwise so that, initially, there is tightening to a first desired value, which correspond to a particular maximum pretension, and that, when all the connections have reached the first desired value, bolting process, if necessary over further graded values, is continued in the same manner until the last desired value is attained.

6. Method as defined in claim 1, wherein the adaptation of the excitation energy during the bolting process is accomplished by increasing the excitation energy continuously or stepwise, as soon as the natural frequency of the screw bolt, as a result of the stagnating bolting process, remains constant, and until the desired value is reached.

7. In an apparatus for tightening and loosening screw-type connections using a manual or motor-operated driving mechanism and a unit for measuring the tension on a screw bolt directly or indirectly, the improvement comprising vibrating and sensing means adapted to becoupled to the screw bolt, said vibrating and sensing means comprising a piezoelectric element means for vibrating said bolt and sensing the vibrations thereof, said apparatus further comprising an alternating voltage generator connected to the piezoelectric element means for vibrating said bolt, a differentiating element coupled to said alternating current generator and to said vibration and sensing means for comparing the excitation and natural frequency of said bolt, and a feedback connection between the differentiating element and the alternating voltage generator for controlling the frequency of said alternating current generator to equal the natural frequency of said bolt.

8. Apparatus as defined in claim 7, wherein the vibrator and sensor means is an annular disk-shaped piezoelectric element which is a vibrator as well as an oscillation sensor.

9. Apparatus as defined in claim 7, wherein the piezoelectric element is disposed between the bolt head or the nut and a flange and is provided with energy lines and measuring lines.

10. Apparatus as defined in claim 7 and wherein the piezoelectric element is disposed between an oscillation transmitter and the socket wrench casing.

* * * * *